United States Patent [19]

Ishiwa et al.

[11] Patent Number: 5,418,269
[45] Date of Patent: May 23, 1995

[54] OPTICAL-GRADE POLYCARBONATE RESIN COMPOSITIONS

[75] Inventors: Kenichi Ishiwa, Shimotsuga; Hideyuki Itoi, Utsunomiya, both of Japan

[73] Assignee: GE Plastics Japan, Tokyo, Japan

[21] Appl. No.: 34,446

[22] Filed: Mar. 19, 1993

[30] Foreign Application Priority Data

Mar. 19, 1992 [JP] Japan .................................. 4-092438

[51] Int. Cl.$^6$ ................................................. C08K 3/38
[52] U.S. Cl. ...................................... 524/315; 524/404; 524/405; 524/317; 524/318; 524/158
[58] Field of Search ............... 524/315, 404, 405, 317, 524/318, 385, 157, 158

[56] References Cited

U.S. PATENT DOCUMENTS

| | | | |
|---|---|---|---|
| 4,131,575 | 12/1978 | Adelmann et al. | 524/311 |
| 4,143,023 | 3/1979 | Mark et al. | 524/157 |
| 4,624,972 | 11/1986 | Nace | 523/136 |
| 4,670,479 | 6/1987 | Miyauchi | 524/154 |
| 4,743,641 | 5/1988 | Shizawa et al. | 524/317 |
| 5,210,124 | 5/1993 | Hovatter et al. | 524/311 |

FOREIGN PATENT DOCUMENTS

| | | |
|---|---|---|
| 0351168 | 1/1990 | European Pat. Off. . |
| 0435124 | 7/1991 | European Pat. Off. . |
| 0436117 | 7/1991 | European Pat. Off. . |
| 2064095 | 7/1972 | Germany . |

OTHER PUBLICATIONS

Patent Abstracts of Japan, vol. 13, No. 579 (C–668) JP 1242660 Sep. 27, 1989.
Patent Abstracts of Japan, vol. 14, No. 115 (C–696) JP 1315459 Dec. 20, 1989.
Patent Abstracts of Japan, vol. 17, No. 37 (C–1019) JP 4253765 Sep. 9, 1992.

*Primary Examiner*—Paul R. Michl
*Assistant Examiner*—John J. Guarriello

[57] ABSTRACT

Optical grade polycarbonate resin compositions and methods for their preparation are disclosed. The disclosed compositions are comprised of polycarbonate resins and esters of aliphatic carboxylic acids and alcohols and exhibit good mold release and thermal stability while experiencing little discoloration during molding.

9 Claims, No Drawings

OPTICAL-GRADE POLYCARBONATE RESIN COMPOSITIONS

This invention relates to optical-grade polycarbonate resin compositions. More specifically, it relates to optical-grade polycarbonate resin compositions having an excellent adhesion to aluminum, a good heat stability, and a high manufacturability.

BACKGROUND OF THE INVENTION

Polycarbonate resins have excellent clarity and heat resistance, and a low water absorption, making them ideally suited as optical-grade materials. In optical products such as optical disks, and especially in compact disks, after molding, because aluminum is vapor-deposited onto one side, bonding of the disk substrate with the aluminum is important. Polycarbonates are generally prepared by a phosgene process. However, polycarbonates obtained by means of this process have an inadequate adhesion with aluminum.

Continuous manufacturability is required in the production of optical products such as compact disks and laser disks. Hence, excellent mold releasability is desired in the polycarbonate resins employed in these products. In addition, because the molding temperature for these products is at least 300° C., the polycarbonate resin must have a high heat stability. However, polycarbonates obtained by the phosgene process have a poor mold releasability, as a result of which the continuous manufacturability of molded products based on such polycarbonate is low, which represents a drawback. Polycarbonate compositions are known in which the mold releasability has been enhanced by the formulation of various parting agents, but these polycarbonate compositions present problems in terms of their heat stability.

Also, prior-art polycarbonate resins discolor during molding. Optical-grade materials should preferably be clear and have a small optical distortion. Methods used for obtaining molded product having a small optical distortion consist of improving the resin flow either by using a high resin temperature during molding or by employing a resin having a low average molecular weight; and thereby avoiding tile formation of optical inhomogeneities on account of flow by the molten resin. However, when the resin temperature during molding is high, discoloration due to decomposition of the resin tends to arise. Moreover, when a polycarbonate resin having a low average molecular weight is used, a marked decrease in the molecular weight occurs during molding and problems such as discoloration arise, resulting in a major decline in the mechanical properties.

Hence, the object of this invention is to provide optical-grade polycarbonate resin compositions in which the above drawbacks have been resolved, which compositions have an excellent adhesion with aluminum, a good heat stability, a good mold-releasability and an excellent manufacturability, and which experience little discoloration during molding.

SUMMARY OF THE INVENTION

The present invention is an optical-grade polycarbonate resin composition which contains:
A) 100 parts by weight of a polycarbonate having a viscosity-average molecular weight of 12,000–18,000, and
B) 0.001–5 parts by weight of an ester of an aliphatic carboxylic acid and an alcohol, and where the polycarbonate is the product of the melt-polymerization of an aromatic dihydroxy compound and a diester carbonate This polycarbonate resin composition has an excellent adhesion to aluminum. Moreover, the mold releasability is excellent. In addition, discoloration during molding is very low. Hence, it has a good heat stability, causes little fouling of the mold during continuous molding, and undergoes little decline in viscosity in the molten state during molding. The above-described effects of this invention are remarkable compared with compositions that use polycarbonate obtained by prior-art phosgene processes or compositions that employ conventional parting agents In other words, the combination of polycarbonate and parting agent according to this invention is able to achieve the advantageous effects of this invention.

Of the various possible optical applications, these polycarbonate resin compositions are especially well suited to use in compact disks and laser disks.

The first requirement of this invention is that the polycarbonate used be the melt-polymerization product of an aromatic dihydroxy compound and a diester carbonate, and that it have a viscosity-average molecular weight of 12,000–18,000. As shown in the comparative examples presented later in this specification, when polycarbonate obtained by a conventional phosgene process is used, the above-described effects cannot be achieved even when ester is compounded. On the other hand, when a polycarbonate that is the melt-polymerization production of an aromatic dihydroxy compound and a diester carbonate is used, by adding an ester to this, the above-described properties can be greatly improved. This was completely unanticipated.

Here, the reference to the melt polymerization product of an aromatic dihydroxy compound and a diester carbonate encompasses all polycarbonates obtained by polymerization methods in which an aromatic dihydroxy compound and a diester carbonate serve as the starting materials. The polymerization process itself is well-known, this being the process of synthesizing a polycarbonate by the transesterification of a dihydroxy compound and a diester carbonate in a molten state.

There is no particular restriction on the aromatic dihydroxy compound, it being possible to use any of the various such compounds known. Examples include compounds having the formula

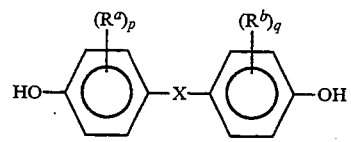

(where $R^a$ and $R^b$ are each independently halogens or monovalent hydrocarbon groups; X is —$C(R^c)(R^d)$—, —$C(=R^e)$—, —O—, —S—, —SO— or —$SO_2$—, with $R^c$ and $R^d$ being independently hydrogens or monovalent hydrocarbon groups and $R^e$ being a divalent hydrocarbon group; and p and q are each independently integers from 0 to 4).

Some examples that may be cited include bis(hydroxyaryl)alkanes such as bis(4-hydroxyphenyl)methane, 1,1-bis(4-hydroxyphenyl)ethane, 2,2-bis(4-hydroxyphenyl)propane, 2,2-bis(4-hydroxyphenyl)butane, 2,2- bis(4-hydroxyphenyl)octane, bis(4-hydroxyphenyl)-phenylmethane, 2,2-bis(4-hydroxy-1-methylphenyl)propane, 1,1-bis(4-hydroxy-t-butylphenyl)propane, and 2,2-bis(4-hydroxy-3-bromophenyl)propane; bis(hydroxyaryl)cycloalkanes such as 1,1-bis(4-hydroxyphenyl)cyclopentane, and 1,1-bis(4-hydroxyphenyl)cyclohexane; dihydroxyarylethers such as 4,4'-dihydroxydiphenyl ether and 4,4'-dihydroxy-3,3'-dimethylphenyl ether; dihydroxydiarylsulfides such as 4,4'-dihydroxydiphenylsulfide and 4,4'-dihydroxy-3,3'-dimethylphenylsulfide; dihydroxydiarylsulfoxides such as 4,4'-dihydroxydiphenylsulfoxide and 4,4'-dihydroxy-3,3'-dimethyldiphenylsulfoxide; and dihydroxydiarylsulfones such as 4,4'-dihydroxydiphenylsulfone and 4,4'-dihydroxy-3,3'-dimethyldiphenylsulfone, although the possibilities are not limited to these. Of the above, the use of 2,2-bis(4-hydroxyphenyl)propane is especially desirable. Aside from the above, the use of compounds having the formula

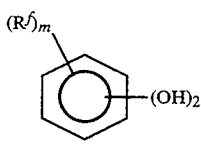

(where $R^f$ each independently represent hydrocarbon groups with 1–10 carbons, the halides thereof, or halogens; and m is an integer from 0–4) is also possible. Examples of these include resorcinol and substituted resorcinols such as 3-methylresorcinol, 3-ethylresorcinol, 3-propylresorcinol, 3-butylresorcinol, 3-t-butylresorcinol, 3-phenylresorcinol, 3-cumylresorcinol, 2,3,4,6-tetrafluororesorcinol and 2,3,4,6-tetrabromoresorcinol; catechol, hydroquinone, and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone and 2,3,5,6-tetrabromohydroquinone; and 2,2,2',2'-tetrahydro-3,3,3',3'-tetramethyl-1,1'-spirobi-[1H-indene]7,7'-diols having the formula

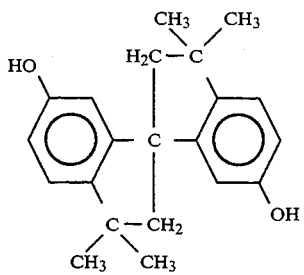

These aromatic dihydroxy compounds may be used alone or as combinations of two or more thereof.

There is no particular restriction on the diester carbonates. Examples that may be cited include diphenyl carbonate, ditolyl carbonate, bis(chlorophenyl) carbonate, m-cresyl carbonate, dinaphthyl carbonate, bis(diphenyl) carbonate, diethyl carbonate, dimethyl carbonate, dibutyl carbonate and dicyclohexyl carbonate, although the possibilities are not limited to these only. The use of diphenyl carbonate is preferable.

These ester carbonates may be used alone or as combinations of two or more thereof.

The above diester carbonates may contain dicarboxylic acids or dicarboxylic acid esters. Examples that may be cited of the dicarboxylic acids and dicarboxylic acid esters include aromatic dicarboxylic acid compounds such as terephthalic acid, isophthalic acid, diphenyl terephthalate and diphenyl isophthalate; aliphatic dicarboxylic acid compounds such as succinic acid, glutaric acid, adipic acid, pimelic acid, suberic acid, azelaic acid, sebacic acid, decanedioc acid, dodecanedioc acid, diphenyl sebacate, diphenyl decanedioate and diphenyl dodecanedioate; and alicyclic dicarboxylic acid compounds such as cyclopropanedicarboxylic acid, 1,2-cyclobutanedicarboxylic acid, 1,3-cyclobutanedicarboxylic acid, 1,2-cyclopentanedicarboxylic acid, 1,3-cyclopentanedicarboxylic acid, 1,2-cyclohexanedicarboxylic acid, 1,3-cyclohexanedicarboxylic acid, 1,4-cyclohexanedicarboxylic acid, diphenyl cyclopropanedicarboxylate, diphenyl 1,2-cyclobutandicarboxylate, diphenyl 1,3-cyclobutanedicarboxylate, diphenyl 1,2-cyclopentanedicarboxylate, diphenyl 1,3-cyclopentanedicarboxylate, diphenyl 1,2-cyclohexanedicarboxylate, diphenyl 1,3-cyclohexanedicarboxylate and diphenyl 1,4-cyclohexanedicarboxylate. These dicarboxylic acids or dicarboxylic acid esters may be used alone or as combinations of two or more thereof. The dicarboxylic acids or dicarboxylic acid esters are included in the above dieslet carbonates in an amount of preferably 50 mol % or less, and even more preferably 30 mol % or less.

When preparing the polycarbonate, polyfunctional compounds having three or more functional groups per molecule may be used along with the aromatic dihydroxy compound and the diester carbonate. It is preferable to use compounds having phenolic hydroxyls or carboxyl groups as these polyfunctional compounds, with the use of compounds having three phenolic hydroxyls being especially desirable. Specific examples of desirable compounds that may be cited include 1,1,1-tris(4-hydroxyphenyl)ethane, 2,2',2''-tris(4-hydroxyphenyl)diisopropylbenzene, α-methyl-α,α',α''-tris(4-hydroxyphenyl)-1,4-diethylbenzene, α,α',α''-tris(4-hydroxyphenyl)-1,3,5-triisopropylbenzene, fluoroglycine, 4,6-dimethyl-2,4,6-tri(4-hydroxyphenyl)-heptane-2, 1,3,5-tri(4-hydroxyphenyl)benzene, 2,2-bis-[4,4-(4,4'-dihydroxyphenyl)cyclohexyl]propane, trimellitic acid, 1,3,5-benzenetricarboxylic acid and pyromellitic acid. Of these, the use of 1,1,1-tris(4-hydroxyphenyl)ethane or α,α',α''-tris(4-hydroxyphenyl)-1,3,5-triisopropylbenzene is especially preferable. The polyfunctional compound should generally be used in an amount of no more than 0.03 mole, preferably 0.001–0.02 mole, and most preferably 0.001–0.01 mole, per mole of the aromatic dihydroxy compound.

When preparing the polycarbonate, use can also be made of compounds capable of introducing at least one of the end groups having the following formulas onto the polycarbonate thus formed:

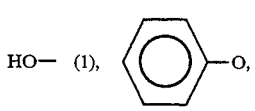

(2)

-continued

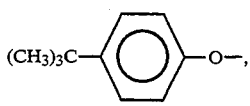   (3)

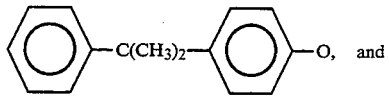   (4)

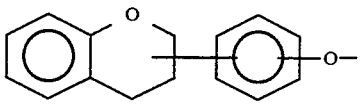   (5)

(where the aromatic rings or the chromanyl groups may be substituted with halogens or alkyls having 1–9 carbons). Examples of compounds capable of introducing the hydroxyl group represented by (1) include diol compounds such as bisphenol A. Examples of compounds capable of introducing the phenoxy group represented by (2) include phenol and diphenyl carbonate. Examples of compounds capable of introducing the p-t-butylphenoxy groups represented by (3) include p-t-butylphenol, p-t-butylphenylphenyl carbonate and p-t-butylphenyl carbonate. Examples of compounds capable of introducing the p-cumylphenoxy groups (p-phenylisopropylphenoxy group) represented by (4) include p-cumylphenol, p-cumylphenylphenyl carbonate and p-cumylphenyl carbonate. Examples that may be cited of the chromanylphenoxy groups represented by (5) include the chromanylphenoxy groups having the following formulas:

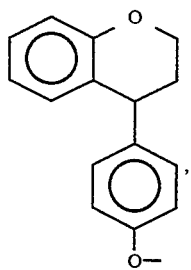   (5-1)

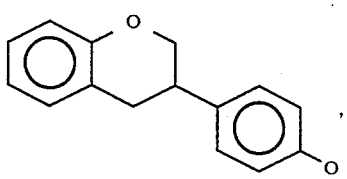   (5-2)

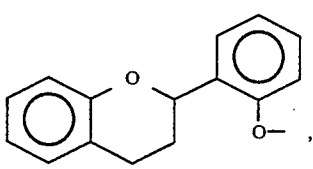   (5-3)

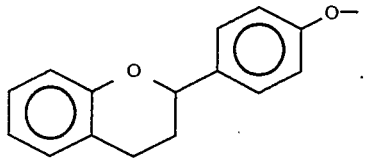   (5-4)

Examples that may be cited of compounds capable of introducing the group represented by (5-1) include 2,2,4-trimethyl-4-(4-hydroxyphenyl)chroman, 2,2,4,6-tetramethyl-4-(3,5-dimethyl-4-hydroxyphenyl)chroman, 2,3,4-trimethyl-2-ethyl-4-(3-nonyl-4-hydroxyphenyl)-7-nonylchroman, 2,2,4-trimethyl-4-(3,5-diethyl-4-hydroxyphenyl)-6-ethylchroman, 2,2,4,6,8-pentamethyl-4-(3,5-dimethyl-4-hydroxyphenyl)chroman, 2,2,4-triethyl-3-methyl-4-(4-hydroxyphenyl)chroman, 2,2,4-trimethyl-4-(3-bromo-4-hydroxyphenyl)chroman, 2,2,4-trimethyl-4-(3-bromo-4-hydroxyphenyl)-6-bromochroman, 2,2,4-trimethyl-4-(3,5-dibromo-4-hydroxyphenyl)-6-bromochroman and 2,2,4-trimethyl-4-(3,5-dibromo-4-hydroxyphenyl)-6,8-dibromochroman; of these, the use of 2,2,4-trimethyl-4-(4-hydroxyphenyl)chroman is especially preferable. Examples that may be cited of compounds capable of introducing the group represented by (5-2) include 2,2,3-trimethyl-3-(4-hydroxyphenyl)chroman, 2,2,3,6-tetramethyl-3-(3,5-dimethyl-4-hydroxyphenyl)chroman, 2,3,4-trimethyl-2-ethyl-3-(3-nonyl-4-hydroxyphenyl)-7-nonylchroman, 2,2,3-trimethyl-3-(3,5-diethyl-4-hydroxyphenyl)-6-ethylchroman, 2,2,3,6,8-pentamethyl-3-(3,5-dimethyl-4-hydroxyphenyl)chroman, 2,2,3-triethyl-3-methyl-3-(4-hydroxyphenyl)chroman, 2,2,3-trimethyl-3-(3-bromo-4-hydroxyphenyl)-6-bromochroman, 2,2,3-trimethyl-3-(3,5-dibromo-4-hydroxyphenyl)-6-bromochroman and 2,2,3-trimethyl-3-(3,5-dibromo-4-hydroxyphenyl)-6,8-dibromochroman; of these, the use of 2,2,3-trimethyl-3-(4-hydroxyphenyl)chroman is especially preferable.
Examples that may be cited of compounds capable of introducing the group represented by (5-3) include 2,4,4-trimethyl-2-(2-hydroxyphenyl)chroman, 2,4,4,6-tetramethyl-2-(3,5-dimethyl-2-hydroxyphenyl)chroman, 2,3,4-trimethyl-4-ethyl-2-( 3,5-dimethyl-2-hydroxyphenyl)-7-nonylchroman, 2,4,4-trimethyl-2-(3,5-dimethyl-2-hydroxyphenyi)-6-ethylchroman, 2,4,4,6,8-pentamethyl-2-(3,5-dimethyl-2-hydroxyphenyl)-6-ethylchroman, 2,4,4-trimethyl-2-(3-bromo-2-hydroxyphenyl)chroman, 2,4,4-trimethyl-2-(3-bromo-2-hydroxyphenyl)-6-bromochroman, 2,4,4-trimethyl-2-(3,5-dibromo-2-hydroxyphenyl)-6-bromochroman and 2,4,4-trimethyl-2-(3,5-dibromo-2-hydroxyphenyl)-6,8-dibromochroman. Of these, the use of 2,2,4-trimethyl-2-(2-hydroxyphenyl)chroman is especially preferable.
Examples that may be cited of compounds capable of introducing the group represented by (5-4) include 2,4,4-trimethyl-2-(4-hydroxyphenyl)chroman, 2,4,4,6-tetramethyl-2-(3,5-dimethyl-4-hydroxyphenyl)chroman, 2,4,4-triethyl-2-(4-hydroxyphenyl)chroman, 2,3,4-trimethyl-4-ethyl-2-(3,5-dimethyl-4-hydroxyphenyl)-7-nonylchroman, 2,4,4-trimethyl-2-(3,5-diethyl-4-hydroxyphenyl)-6-ethylchroman, 2,4,4,6,8-pentamethyl-2-(3,5-dimethyl-4-hydroxyphenyl)-6-ethylchroman, 2,4,4-trimethyl-2-(3-bromo-4-hydroxyphenyl)chroman, 2,4,4-trimethyl-2-(3-bromo-4-hydroxyphenyl)-6-bromochroman, 2,4,4-trimethyl-2-(3,5-dibromo-4-hydroxyphenyl)-6-bromochroman and 2,4,4-trimethyl-2-(3,5-dibromo-4-hydroxyphenyi)-6,8-dibromochroman. Of these, the use of 2,4,4-trimethyl-2-(4-hydroxyphenyl)-chroman is especially preferable. In the above compounds, the aromatic rings or alicyclic rings may be further substituted with halogens or alkyl groups having 1-9 carbons. These compounds may be used alone or as combinations of two or more thereof. In this invention, the proportion of the above-cited dihydroxy compound residues should preferably represent no more than 50%, and in particular no more than 30%, of the end groups.

It is preferable that the diester carbonate be used in an amount of 1.00-1.30 mole, and especially 1.01-1.20 mole, per mole of the aromatic dihydroxy compound, and that these be reacted in the presence of a catalyst.

The compounds proposed by the present applicant in Japanese Unpublished Unexamined Patent Application [Tokugan] No. H2-85,218 (1990), for example, may be used as the catalyst. For instance, preferable use can be made of the organic acid salts, inorganic acid salts, oxides, hydroxides, hydrides or alcoholates of metals such as alkali metals and alkaline earth metals. Specific examples that may be cited of these compounds include sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium borohydride, lithium borohydride, sodium borophenylate, sodium benzoate, potassium benzoate, lithium benzoate, disodium hydrogenphosphate, dipotassium hydrogenphosphate, dilithium hydrogenphosphate, the disodium, dipotassium and dilithium salts of bisphenol A, and the sodium, potassium and lithium salts of phenol; calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate. However, the possibilities are not limited to these alone. These compounds can be used alone or in combinations of two or more thereof. These alkali metal compounds and/or alkaline earth metal compounds should be used in an amount of $10^{-8}$ to $10^{-3}$ mole, preferably $10^{-7}$ to $10^{-6}$ mole, and most preferably $10^{-7}$ to $8 \times 10^{-7}$ mole, per mole of the aromatic dihydroxy compounds.

Together with the above alkali metal compounds and/or alkaline earth metal compounds, it is also possible to use (b) basic compounds as the catalysts. These basic compounds include nitrogen compounds. Specific examples that may be cited of these include alkyl, aryl or alaryl group-bearing ammonium hydroxides such as tetramethylammonium hydroxide, tetraethylammonium hydroxide, tetrabutylammonium hydroxide and trimethylbenzylammonium hydroxide; tertiary amines such as trimethylamine, triethylamine, dimethylbenzylamine and triphenylamine; secondary or primary amines bearing alkyl groups such as methyl and ethyl groups or aryl groups such as phenyl or toluyl groups; ammonia; and basic salts such as tetramethylammonium borohydride, tetrabutylammonium borohydride, tetrabutylammonium tetraphenylborate and tetramethylammonium tetraphenylborate. However, the possibilities are not limited to these alone. Of the above, the use of ammonium hydroxide is especially preferable. These basic compounds may be used alone or as combinations of two or more thereof.

In this invention, by using a combination of the above-described (a) alkali metal compounds and/or alkaline earth metal compounds, and (b) nitrogen-containing basic compounds as the catalyst, high-molecular-weight polycarbonates can be obtained at a high polymerization activity.

Alternatively, use can be made, for example, of a combination comprising (a) alkali metal compounds and/or alkaline earth metal compounds, (b) nitrogen-containing basic compounds, and (c) boric acid and/or boric acid esters as the catalyst. When employing a catalyst having this type of composition, it is preferable to use (a) the alkali metal compounds and/or alkaline earth metal compounds in the above-indicated amount, and to use (b) the nitrogen-containing basic compound in an amount of $10^{-6}$ to $10^{-1}$ mole, and especially $10^{-5}$ to $10^{-2}$ mole, per mole of the aromatic dihydroxy compound. A compound having the formula

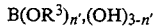

$$B(OR^3)_{n'}(OH)_{3-n'}$$

(where $R^3$ is a hydrogen, aliphatic hydrocarbon group, alicyclic hydrocarbon group or aromatic hydrocarbon group, and $n'$ is an integer from 1 to 3) is preferable for use as (c) the boric acid or boric acid ester. Examples that may be cited include boric acid, trimethyl borate, triethyl borate, tributyl borate, trihexyl borate, triheptyl borate, triphenyl borate, tritolyl borate and trinaphthyl borate. Of these, the use of triphenyl borate is especially desirable. When these (c) boric acid or boric acid ester compounds are employed, it is preferable to use them in an amount of $10^{-6}$ to $10^{-1}$ mole, and preferably $10^{-5}$ to $10^{-2}$ mole, per mole of the aromatic dihydroxy compound.

The temperature, pressure and other conditions at the time of the melt-polymerization reaction may be selected as desired, it being possible to use conventional conditions that are commonly known. More specifically, the first reaction stage should be carried out at a temperature of 80°-250° C., preferably 100°-230° C., and most preferably 120°-190°, for a period of 0-5 hours, preferably 0-4 hours, and most preferably 0.25-3 hours, and at normal pressure. Next, the reaction temperature is raised and the aromatic dihydroxy compound is reacted with the diester carbonate while placing the reaction system under a vacuum. It is desirable to carry out the reaction between the aromatic dihydroxy compound and the diester carbonate so that the vacuum ultimately becomes 0.05-5 mm Hg and the temperature becomes 240°-320° C.

The reaction between the above-described aromatic dihydroxy compound and the diester carbonate may be carried out continuously or in a batchwise manner. Moreover, the reaction apparatus used when carrying out the above reaction may be a tank-type, pipe-type or column-type reactor.

In this invention, a polycarbonate having a viscosity-average molecular weight of 12,000-18,000 is used as the polycarbonate obtained by the above-described melt polymerization process. When the viscosity-average molecular weight is less than 12,000, this gives rise to problems with regard to the physical properties and shape, such as a marked decrease in the molecular weight at the time of molding, declines in the mechanical properties and the heat resistance, and a tendency for crystallization to arise. When the viscosity-average molecular weight is greater than 18,000, the fluidity decreases; as a result, it becomes necessary to carry out molding at a high resin temperature in excess of about 300° C. in order to produce a molded product having little optical distortion. For this reason, decomposition of the resin cannot be avoided, thereby giving rise to problems that impair the clarity of the molded product, such as discoloration and silver streaking. Here, the viscosity-average molecular weight itself can be computed as follows from the intrinsic viscosity of the polycarbonate resin:

$$\eta = KM^a$$

(where $\eta$ is the intrinsic viscosity (dl/g), K is the constant $1.23 \times 10^{-4}$, M is the viscosity-average molecular weight, and a is the exponent 0.83).

A second requirement of this invention is that the ester of the aliphatic carboxylic acid and the alcohol be included in an amount of 0.001–5 parts by weight per 100 parts by weight of polycarbonate.

There is no particular restriction on the ester of the aliphatic carboxylic acid and the alcohol, it being possible to use various known esters of this type. Examples that may be cited include the esters of saturated or unsaturated aliphatic carboxylic acids, dicarboxylic acids or tricarboxylic acids with saturated or unsaturated monohydric alcohols such as ethanol or trifluoroethanol, saturated or unsaturated dihydric alcohols such as ethylene glycol or diethylene glycol, saturated or unsaturated trihydric alcohols such as glycerol, saturated or unsaturated tetrahydric alcohols such as pentaerythritol, or saturated or unsaturated polyhydric alcohols having five or more hydroxyl groups. However, the possibilities are not limited to these alone. Moreover, the reference here to aliphatic carboxylic acids includes also alicyclic carboxylic acids. Preferable use can be made of the esters of aliphatic carboxylic acids having the formula

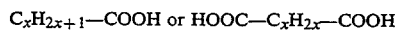

(where x is an integer from 5 to 34) and alcohols having one of the following formulas

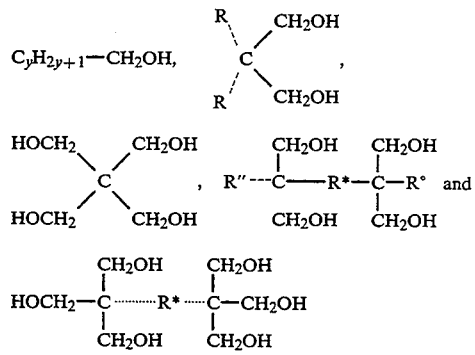

[where y is an integer from 1 to 20; R and R' are each independently alkyls having 1–10 carbons or substituted alkyls thereof, or R and R' are coupled so as to form a 5- or 6-membered ring; R'' and R° are each independently alkyls with 1–4 carbons or substituted alkyls thereof; and R* is an alkylene group having 1–4 carbons or —$(CH_2)_z$—O—$(CH_2)_z$— (where z is an integer from 1 to 4)]. Specific examples that may be cited of the carboxylic acids represented by the above formula include stearic acid, valeric acid, caproic acid, captic acid, lauric acid, arachic acid, behenic acid, lignoceric acid, cerotic acid, melissic acid, tetratriacontanoic acid, glutaric acid, adipic acid and azelaic acid. Specific examples that may be cited of the alcohols represented by the above formulas include 2,2-dihydroperfluoropropanol, neopentylene glycol, pentaerythritol, ditrimethylol propane and dipentaerythritol. The use of esters of aliphatic carboxylic acids and polyhydric alcohols having two or more hydroxyls is even more desirable, with the most preferable ester being pentaerythritol tetrastearate. Aside from these, it is also possible to use esters containing unsaturated bonds, such as pentaerythritol acrylate or trimethylolpropane trimethacrylate, or esters of aliphatic carboxylic acids and alcohols having substituents other than aryls. It is also possible to use several compounds as the esters according to this invention. These esters are used in an amount of 0.001–5 parts by weight, and preferably 0.01–1 part by weight, per 100 parts by weight of the polycarbonate. When the amount of ester is less than 0.001 part by weight, almost no improvement in the mold releasability occurs; on the other hand, when this exceeds 5 parts by weight, the mold releasability can be improved, but a loss occurs in the heat stability as well as the mechanical properties, and most particularly the impact strength.

In addition, it is preferable that the resin compositions of the present invention contain also 0.00001–0.00045 part by weight of a sulfur-containing acidic compound having a pKa value of 3 or less, or a derivative formed from this, per 100 parts by weight of the polycarbonate. By means of this, the heat resistance of the polycarbonate resin composition is improved; in particular, reductions in the molecular weight during molding are suppressed. The sulfur compound need only be a sulfur compound having an acidity such that the pKa is 3 or less, or be a derivative of such a compound. The use of compounds having the formula

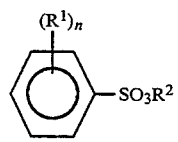

(where $R^1$ is an alkyl group with 1–50 carbons or a group in which the hydrogens therein are substituted with halogens; $R^2$ is a hydrogen, an alkyl with 1–50 carbons, or a group in which the hydrogens therein are substituted with halogens; and n is an integer from 0 to 3) is preferable. Specific examples that may be cited of these compounds include sulfonic acids such as benzenesulfonic acid and p-toluenesulfonic acid; sulfonic acid esters such as methyl benzenesulfonate, ethyl benzenesulfonate, butyl benzenesulfonate, octyl benzenesulfonate, phenyl benzenesulfonate, methyl p-toluenensulfonate, ethyl p-toluenesulfonate, butyl p-toluenesulfonate, octyl p-toluenesulfonate and phenyl p-toluenesulfonate; as well as trifluoromethanesulfonic acid, naphthalenesulfonic acid, sulfonated polystyrene and methyl acrylate-sulfonated styrene copolymer, although the possibilities are not limited to these alone. Two or more of these compounds may be used together. The use of butyl p-toluenesulfonate is especially desirable.

It is preferable that boron compounds also be compounded in the polycarbonate resin compositions of the present invention. Examples of the boron compounds that may be cited include the boric acid or boric acid esters cited earlier as catalyst components, but the possibilities are not limited to these alone. The use of compounds having the formula cited earlier of $B(OR^3)_{n'}(OH)_{3-n'}$ is preferable. The use of triphenyl borate as the boron compound is especially preferable. Discoloration of the polycarbonate resin composition during molding can be prevented by including boron compounds in the composition. When formulation involving combination with the above-cited sulfur-containing compound is carried out, the discoloration of polycarbonate resin compositions during molding can be especially well prevented. The amount of the boron compound compounded should preferably be 0.00001–0.2 part by weight, and most preferably 0.00005–0.02 part by weight, per 100 parts by weight of the polycarbonate. When the boron compound is added during polycarbonate polymerization as one of the catalyst components, there is no need for addition following polymerization.

When too much of the above-described acidic sulfur-containing compounds or derivatives thereof are used, the water resistance of the polycarbonate-based resin composition may decrease.

In addition, phosphorus compounds or carboxylic acid esters may be compounded into the polycarbonate-based resin compositions of the present invention as process stabilizers (antioxidants). The phosphorus compounds may be phosphoric acid esters and phosphorous acid esters. Examples that may be cited of the phosphoric acid esters include trimethylphosphate, triethylphosphate, tributylphosphate, trioctylphosphate, tridecylphosphate, trioctadecylphosphate, distearylpentaerythrityl diphosphate, tris(2-chloroethyl)phosphate and tris(2,3-dichloropropyl)phosphate; tricycloalkylphosphate such as tricyclohexylphosphate; and triarylphosphates such as triphenylphosphate, tricresylphosphate, tris(nonylphenyl)phosphate and 2-ethylphenyldiphenylphosphate. Examples that may be cited of phosphorous acid esters include trialkylphosphites such as trimethylphosphite, triethylphosphite, tributylphosphite, trioctylphosphite, tris(2-ethylhexyl)phosphite, trinonylphosphite, tridecylphosphite, trioctadecylphosphite, tristearylphosphite, tris(2-chloroethyl)phosphite and tris(2,3-dichloropropyl)phosphite; tricycloalkylphosphites such as tricyclohexylphosphite; triarylphosphites such as triphenylphosphite, tricresylphosphite, tris(ethylphenyl)phosphite, tris(2,4-di-t-butylphenyl)phosphite, tris(nonylphenyl)phosphite and tris(hydroxyphenyl)phosphite; arylalkylphosphites such as phenyldidecylphosphite, diphenyldecylphosphite, diphenylisooctylphosphite, phenylisooctylphosphite and 2-ethylhexyldiphenylphosphite; and also phosphorous acid esters having the formula $P(OR^g)_3$ (where $R^g$ are each independently aliphatic hydrocarbon groups, alicyclic hydrocarbon groups or aromatic hydrocarbon groups) such as distearylpentaerythrityldiphosphite and bis(2,4-di-t-butylphenyl)pentaerythrityldiphosphite. Hypophosphorous acids, pyrophosphoric acids polyphosphoric acids or the like may also be used. Of these, the use of phosphorous acid esters, and especially tris(2,4-di-t-butylphenyl)phosphite, is preferable. Examples that may be cited of carboxylic acid esters other than those already cited above include n-octadecyl-3-(4'-hydroxy-3',5'-di-t-butylphenyl)propionate, and various alicyclic diepoxycarboxylates, although the possibilities are not limited to these alone. The combined use of two or more stabilizers is also possible. These compounds should preferably be used in an amount of no more than 0.1 part by weight per 100 parts by weight of the polycarbonate.

The polycarbonate resin compositions of the present invention should preferably contain epoxy compounds. In this way, the above-cited boron compounds or acidic sulfur-containing compounds present in excess within the resin composition react with the epoxy compounds and are thus neutralized, thereby making it possible to mold products having excellent properties such as hue, heat resistance, and water resistance. The epoxy compounds used are preferably compounds having at least one epoxy group per molecule. Examples that may be cited of these include epoxidized soybean oil, epoxidized linseed oil, phenylglycidyl ether, allylglycidyl ether t-butylphenylglycidyl ether, 3,4-epoxycyclohexylmethyl-3,4-epoxycyclohexane carboxylate, 3,4-epoxy-6-methylcyclohexylmethyl-3,4-epoxy-6-methylcyclohexane carboxylate, 2,3-epoxycyclohexylmethyl-3,4-epoxycyclohexane carboxylate, 4-(3,4-epoxy-5-methylcyclohexyl)butyl-3,4-epoxycyclohexane carboxylate, 3,4-epoxycyclohexylethylene oxide, cyclohexylmethyl-3,4-epoxycyclohexane carboxylate, 3,4-epoxy-6-methylcyclohexylmethyl-6-methylcyclohexane carboxylate, bisphenol A-diglycidyl ether, tetrabromobisphenol A-glycidyl ether, the diglycidyl ester of phthalic acid, the diglycidyl ester of hexahydrophthalic acid, bis-epoxydicyclopentadienyl ether, bis-epoxyethylene glycol, bis-epoxycyclohexyladipate, butadiene diepoxide, tetraphenyl ethylene epoxide, octyl epoxyphthalate, epoxidized polybutadiene, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexane carboxylate, N-butyl-2,2-dimethyl-3,4-epoxycyclohexane carboxylate, cyclohexyl-2-methyl-3,4-epoxycyclohexane carboxylate, N-butyl-2-isopropyl-3,4-epoxy-5-methylcyclohexane carboxylate, octadecyl-3,4-epoxycyclohexane carboxylate, 2-ethylhexyl-3',4'-epoxycyclohexane carboxylate, 4,6-dimethyl-2,3-epoxycyclohexyl-3', 4'-epoxycyclohexane carboxylate, 4,5-epoxy tetrahydrophthalic anhydride, 3-t-butyl-4,5-epoxy tetrahydrophthalic anhydride, diethyl-4,5-epoxy-cis-1,2-cyclohexane dicarboxylate and di-n-butyl-3-t-butyl-4,5-epoxy-cis-1,2-cyclohexane dicarboxylate. The possibilities are not limited only to these, however. These epoxy compounds may be used alone or as combinations of two or more thereof. There are no particular restrictions on the amounts in which the epoxy compounds are used, although it is generally desirable to use them in an amount of 0.001–0.1 part by weight, and in particular 0.001–0.08 part by weight, per 100 pans by weight of the polycarbonate.

One or more conventional additives such as heat stabilizers, weather stabilizers, antistatic agents, slip agents, anti-blocking agents, anti-fogging agents, lubricants, dyes, natural oils, synthetic oils and waxes may be compounded in the polycarbonate resin compositions of the invention, provided this is done within a range that does not compromise the object of this invention.

There is no particular restriction on the method for producing the resin compositions of the present invention from the various above components. The various components may be compounded in any sequence. For example, the ester and any other components may be added to the molten polycarbonate and mixed together, or the esters and any other components may be added to a solution of the polycarbonate and mixed together. Specific examples of such processes that may be cited include a process whereby the ester and any of the other components are directly added and mixed, either separately or at the same time, to the molten polycarbonate within the reactor or the extruder that has been obtained with the completion of the polymerization reaction; a process whereby the polycarbonate obtained is pelletized, and these pellets are fed together with ester and any of the other components to a single-screw or twin-screw extruder, in which they are melt-mixed, or a process whereby the polycarbonate obtained is dissolved in a suitable solvent (e.g., methylene chloride, chloroform, toluene, tetrahydrofuran), and the ester and any other components are added, either separately or at the same time, to this solution, following which stirring is carried out.

In this invention, the polycarbonate resin composition should preferably be vacuum treated. There are no particular restrictions on this vacuum treatment, it being possible to use a reactor equipped with a vacuum device or an extruder equipped with a vacuum device. The reactor equipped with a vacuum device may be a vertical tank-type reactor or a horizontal tank-type reactor, although the use of a horizontal tank-type reactor is preferable. The extruder equipped with a vacuum device may be a vented single-screw extruder or twin-screw extruder; pelletization while carrying out vacuum treatment with an extruder is also possible. When vacuum treatment is carried out in a reactor, the pressure at this time should preferably be 0.05–750 mmHg, and most preferably 0.05–5 mmHg. When treatment is carried out using an extruder, this should preferably be set at 1–750 mmHg, and most preferably 5–700 mmHg. This vacuum treatment should preferably be carried out at 240°–350° C. When a reactor is used, it is preferable to carry out treatment for a period of about 5 minutes to 3 hours; when an extruder is used, this should be carried out for a period of about 10 seconds to 15 minutes. When vacuum treatment is administered in this way on polycarbonate compositions, a polycarbonate composition can be obtained in which the level of residual monomer or oligomer has been reduced. For example, when melt polymerization is carried out using diphenyl carbonate as the diester carbonate, the residual amount of diphenyl carbonate in the polycarbonate can be reduced by vacuum treatment. It is preferable that the polycarbonate used in this invention contain an amount of no more than 0.1 part by weight, and preferably no more than 0.01 part by weight, of this type of diphenyl carbonate.

The resin compositions of the present invention obtained in the above manner have an excellent adhesion to aluminum and a good mold releasability and heat stability. In addition, little discoloration or fouling of the mold occurs during molding.

The invention shall now be illustrated more concretely by means of examples, although the invention is in no way restricted by these examples.

DETAILED DESCRIPTION OF THE PREFERRED EMBODIMENTS

Reference Example 1

Synthesis of Polycarbonate by Melt Polymerization (PC1)

A 25-liter stirring tank was charged with 0.44 kilomole of bisphenol A (GE Plastics Japan) and 0.44 kilomole of diphenyl carbonate (Enichem Synthesis SPA Co.), and these reactants were melted at 140° C. after the tank was flushed with nitrogen.

Next, the temperature was raised to 180° C., 0.011 mole of triphenylborate was added, and stirring was carried out for 30 minutes.

Next, 0.00044 mole of sodium hydroxide and 0.11 mole of tetramethyl ammonium hydroxide were added as the catalysts, and stirring was carried out for 30 minutes. The temperature was then raised to 210° C., and the pressure was gradually lowered at the same time to 200 mmHg. After 30 minutes, the temperature was raised to 240° C. and the pressure was gradually lowered at the same time to 15 mmHg. After this, while holding the temperature and pressure constant, the amount of phenol distilled off was measured; the pressure was returned to atmospheric pressure with nitrogen the moment that phenol distillation ceased. The time required for reaction was one hour.

The intrinsic viscosity ($\eta$) of the reactant thus obtained was 0.15 dl/g.

Next, this reactant was pressurized with a gear pump, charged into a centrifugal thin-film evaporator, and the reaction carried forward. The temperature and pressure of the thin-film evaporator were respectively controlled to 270° C. and 2 mmHg. This reactant was fed at a rate of 40 kg/hour by means of a gear pump from the bottom of the evaporator into a twin-shaft horizontal-type stirring polymerization tank (L/D=3; stirring element rotation diameter, 220 mm; internal capacity, 80 liters) controlled to 280° C. and 0.2 mmHg, and polymerized at a residence time of 30 minutes.

This polymer was then charged in the molten state into a twin-screw extruder (L/D=17.5; barrel temperature, 285° C.) by means of a gear pump and 2 ppm of butyl p-toluenesulfonate (based on the resin) was mixed into this, following which the composition was passed through a die, rendered into a strand, and cut with a cutter to give pellets.

The polymer thus obtained had a viscosity-average molecular weight of 15,500.

(Examples 1 and 2, Comparative Examples 1–3)

The various ingredients shown below were compounded in the indicated ratios, mixed in a single-screw extruder (L/D=17.5; temperature, 280° C.), and pellets obtained.

PC1: polycarbonate obtained in Reference Example 1
PC2: polycarbonate obtained from bisphenol A by a phosgene process (viscosity-average molecular weight, 15,500)
PETS: pentaerythritol tetrastearate
Stabilizers:
Stb1: tris(2,4-di-t-butylphenyl)phosphate (Adeka Argus Chemical Co., Ltd.; MK-2112E TM)
Stb2: alicyclic diepoxycarboxylate (Daicel Chemical Industries; Celloxcide 2021P TM)

The pellets thus obtained were extruded with a single-screw extruder (L/D=28; temperature, 280° C.), following which the molded product (150(H)×80(W)×70mm(D)) was injection-molded in a 150-ton molding machine at a cylinder temperature of 280° C. and a mold temperature of 80° C.

Also, using a nickel stamper, compact disk (CD) plates having a diameter of 120 mm were fabricated continuously for 24 hours from the various above-described pellets at a cylinder temperature of 350°, a cycle time of 7 seconds, and a mold temperature of 80° C.

Aluminum was then vapor-deposited onto one side of the CD plates thus fabricated, thereby giving a CD.

The adhesion between the resin composition and the aluminum in the CDs thus obtained was evaluated as follows. After 100 hours of exposure at 80° C. and 85% humidity, a number of orthogonally intersecting lines (scratches) were formed in the surface using a jig such as to create 50 squares measuring 1 mm on a side. Cellophane tape was attached on top of this, then peeled away, and the number of peeled squares was measured. The results are given in Table 1.

The molded products obtained as described above were also evaluated with regards to the following.

Initial YI (yellowing index): An injection-molded sheet having a thickness of 3 mm was molded at a cylinder temperature of 290° C., an injection pressure of 1000 kg/cm, a cycle time of 45 seconds, and a mold temperature of 90° C. The X, Y and Z values ,sere measured by the transmission method using a Nippon Denshoku Kogyo Colorand Color Difference Meter ND-1001 DP. The yellowness index (YI) was measured by means of the following equation.

$$YI = 100 \frac{(1.277X - 1.060Z)}{Y}$$

YI after 15 minutes at 320° C. (abbreviated as "320-15YI" in Table 1): The composition was held at 320° C. for 15 minutes in the cylinder of an injection molding machine, after which it was injection-molded under the same conditions as above (at 320° C., however). Measurement was then carried out by means of the same procedure as for the initial YI.

Initial MI (Initial Melt Index): This was measured, at a temperature of 300° C. and under a load of 1.2 kg, for pellets in general accordance with the method in JIS K-7210.

MI after 15 minutes at 320° C. (abbreviated as "320-15 MI" in Table 1): This was measured by carrying out the same procedure as for the initial MI on the molded plate obtained by injection molding after being held for 15 minutes at 320° C. as described above.

These values are given in Table 1.

The following tests were carded out during fabrication of the above-described CD plates.

Continuous Manufacturability: The presence or absence of trouble due to continuous production was evaluated.

Stamper Fouling after 24 Hours of Continuous Production: After carrying out the above-described CD plate production operations for 24 hours, the stamper was visually examined and evaluated.

The results of these tests are also given in Table 1.

TABLE 1

| Example[1] | Ex. 1 | Ex. 2 | CE 1 | CE 2 | CE 3 |
|---|---|---|---|---|---|
| Composition | | | | | |
| PC1 | 100 | 100 | 100 | — | — |
| PC2 | — | — | — | 100 | 100 |
| PETS | 0.1 | 0.3 | — | 0.1 | 0.3 |
| Stb1 | 0.01 | 0.01 | 0.01 | 0.01 | 0.01 |
| Stb2 | 0.01 | 0.01 | 0.01 | 0.01 | 0.01 |
| Bonding with aluminum (number of squares) | 1 | 1 | 1 | 4 | 6 |
| Properties of molded products | | | | | |
| Initial YI | 1.4 | 1.4 | 1.3 | 1.4 | 1.4 |
| 320-15YI | 1.6 | 1.6 | 1.5 | 2.2 | 2.4 |
| Initial MI | 10.5 | 10.8 | 10.5 | 10.8 | 10.8 |
| 320-15 MI | 11.9 | 12.1 | 11.8 | 15.0 | 16.0 |
| Results of tests during CD plate production | | | | | |
| Continuous manufacturability | possible | possible | impossible[2] | possible | possible |
| Stamper fouling after 24 hours continuous production | no | no | no | yes | yes |

[1]Ex.: Example of the invention; CE: Comparative Example
[2]Continuous production was impossible due to problems owing to poor mold releasability (disk plate remained in mold, etc.)

As is apparent from the examples, compared with compositions in which polycarbonate resins obtained by the phosgene process serve as the chief component, the resin compositions according to this invention have excellent adhesion with aluminum. In addition, they have a good mold releasability and heat stability, as a result of which there is little mold fouling and the continuous manufacturability is good. Additional advantages of the resin compositions according to this invention are the fact that both discoloration during molding and molecular weight reduction are very limited. The resin compositions of this invention are especially well-suited for use in compact disks and laser disks.

What is claimed is:

1. An optical-grade polycarbonate resin composition which comprises
    A) 100 parts by weight of a polycarbonate having a viscosity-average molecular weight of 12,000–18,000 prepared by melt polymerizing an aromatic dihydroxy compound and from 1.00 to 1.30 moles of a diester carbonate per mole of aromatic dihydroxy compound in the presence of
        i) an alkali metal compound, an alkaline earth metal compound or
        ii) a nitrogen—containing basic compound in an amount of from $10^{-6}$ to $10^{-1}$ moles per mole of aromatic dihydroxy compound and
        iii) a Boron compound of the formula $B(OR^3)_{n'}(OH)_{3-n'}$ where $R^3$ is a hydrogen, aliphatic hydrocarbon group, alicyclic hydrocarbon group or aromatic hydrocarbon group, and n' is an integer from 1 to 3;

B) from 0.001 to 5 parts by weight of an ester of an aliphatic carboxylic acid and an alcohol per 100 parts by weight of polycarbonate;

C) from 0.00001 to 0.00045 parts by weight of an acidic sulfur-containing compound per 100 parts by weight of polycarbonate with a pKa value of 3 or less, of the formula

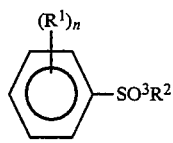

where $R^1$ is an alkyl group with 1–50 carbons in which the hydrogens may be replaced by halogens, and $R^2$ is a hydrogen or an alkyl group with 1–50 carbons in which the hydrogens may be replaced by halogens; and D) from 0.00001 to 0.2 parts by weight of the boron compound as set forth in A)iii) above whereby the composition has excellent adhesion to aluminum as well as good mold releaseability, and heat stability.

2. The polycarbonate resin composition of claim 1, wherein the resin composition is vacuum treated at a pressure of from 0.05 to 750 mm Hg and a temperature of from 240° to 350° C.

3. The polycarbonate resin composition of claim 2 which is vacuum treated in an extruder at a pressure of from 1 to 750 mm Hg.

4. The polycarbonate resin composition of claim 2 which is vacuum treated in a reactor.

5. The polycarbonate resin composition of claim 4 wherein the pressure is from 0.05 to 5 mm Hg.

6. The polycarbonate resin composition of claim 2 wherein the diester carbonate is diphenyl carbonate and the amount of diphenyl carbonate in the polycarbonate resin composition after vacuum treatment is no more than 0.1 part by weight per 100 parts by weight of the polyester resin composition.

7. The polycarbonate resin composition of claim 1 wherein the boron compound in A) polycarbonate is in the amount of from $10^{-6}$ to $10^{-1}$ moles per mole of the aromatic dihydroxy compound.

8. The polycarbonate resin composition of claim 7 wherein the aromatic dihydroxy compound is 2,2-bis (4-hydroxyphenyl) propane.

9. The polycarbonate resin composition of claim 8 wherein the diester carbonate is diphenyl carbonate.

* * * * *